United States Patent
Maehara

(10) Patent No.: US 8,436,550 B2
(45) Date of Patent: May 7, 2013

(54) LED LAMP DRIVING CIRCUIT WITH DIMMING CAPABILITY

(75) Inventor: Minoru Maehara, Matsubara (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 12/890,435

(22) Filed: Sep. 24, 2010

(65) Prior Publication Data

US 2011/0074292 A1    Mar. 31, 2011

(30) Foreign Application Priority Data

Sep. 25, 2009    (JP) .................................. 2009-221602

(51) Int. Cl.
G05F 1/00    (2006.01)
H05B 37/02   (2006.01)

(52) U.S. Cl.
USPC .......................................... 315/291; 315/307

(58) Field of Classification Search .................. 315/291, 315/307, 312, 224, 246, 247, 248, DIG. 4
See application file for complete search history.

(56) References Cited

U.S. PATENT DOCUMENTS

| | | | |
|---|---|---|---|
| 6,046,550 A * | 4/2000 | Ference et al. | 315/291 |
| 6,786,625 B2 * | 9/2004 | Wesson | 362/545 |
| 6,943,503 B2 * | 9/2005 | Ozasa et al. | 315/224 |
| 7,515,445 B2 * | 4/2009 | Lin | 363/98 |
| 7,605,550 B2 * | 10/2009 | Ferentz et al. | 315/312 |
| 7,619,539 B2 * | 11/2009 | Veskovic et al. | 340/4.3 |
| 2009/0091272 A1 * | 4/2009 | Yamada et al. | 315/307 |

FOREIGN PATENT DOCUMENTS

| | | |
|---|---|---|
| JP | 200249992 | 2/2002 |
| JP | 2004327152 | 11/2004 |

* cited by examiner

*Primary Examiner* — Minh D A
(74) *Attorney, Agent, or Firm* — Waddey & Patterson, P.C.; Mark J. Patterson; Gary L. Montle

(57) ABSTRACT

An LED driving circuit includes a dimming control value detection circuit adapted to detect a dimming control value which indicates a ratio of the actual current to be supplied from a current source to the driving circuit during a predetermined time period with respect to a rated current. A control circuit is adapted to regulate the amount of current supplied to one or more LEDs during the predetermined time period to either of the dimming control value squared or the dimming control value cubed times the rated current. The characteristic of light output to the amount of current supplied from the current source during a predetermined time period is therefore made approximate to that of an incandescent bulb.

20 Claims, 5 Drawing Sheets

LED LAMP DRIVING CIRCUIT WITH DIMMING CAPABILITY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-221602, filed Sep. 25, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to dimmable LED driving circuits and LED lamps including the same.

In conventional light fixtures using an incandescent bulb, dimming control functions are ordinarily performed by phase control of an AC power source, wherein the length of a conduction period is adjusted (i.e., a time duration of an AC waveform cycle) to adjust the amount of current supplied to the incandescent bulb, and thereby changing the magnitude of light output.

In recent years, light-emitting diodes (LED) that consume less power and have a longer life have become increasingly popular alternatives to incandescent bulbs. In some cases an LED lamp is desirably used in an existing light fixture intended for an incandescent bulb, but in such cases the demand remains for dimming control to be performed based upon phase control as described above.

As is known in the art, however, an LED and an incandescent bulb have different characteristics associated with a change in light output relative to change in current (i.e., light output versus current characteristics). While the light output vs. current characteristic of an LED is approximately linear, the light output vs. current characteristic of an incandescent bulb is nonlinear. Therefore, when dimming control based upon phase control (similar to that performed on an incandescent bulb) is performed on an LED, the magnitude of light output of the LED is different from that of the incandescent bulb even where the dimming rates are set the same, which may generate a strange and/or uncomfortable feeling. In particular, where an incandescent bulb and an LED are used in combination and lit simultaneously, the different light output vs. current characteristics are even more prominent.

Therefore, techniques for dimming control of an LED to exhibit a dimming characteristic similar to that of an incandescent bulb have been provided. Generally stated with regards to these techniques as are known in the art, current flow in an LED is controlled so as to provide a light output equivalent to that provided by an incandescent bulb in response to an equivalent external dimming control value.

For example, there has been proposed an LED driving circuit (i.e., LED lighting control means) which supplies in response to an input current from a power source (i.e., an AC constant current source) a reduced output current to an LED, to obtain a light output equivalent to that obtained when the output current is caused to flow without change in an incandescent bulb. Similarly, it has also been known to control current output to an LED based on a target current having a dimming curve similar to that of an incandescent bulb in response to the effective value of a phase-controlled AC voltage.

In configurations and techniques as conventionally known, however, it is required to determine or otherwise provide a formula for calculating current flow in an LED in advance from a relationship between the light output vs. current characteristic of an incandescent bulb and the light output vs. current characteristic of an LED. These driving circuits may include, for example, a program which calculates the target current in an LED according to the formula. Therefore, such a driving circuit generally becomes quite complex and expensive.

BRIEF SUMMARY OF THE INVENTION

In accordance with certain aspects of the present invention, a driving circuit may be able to realize, in performing dimming control for an LED, a characteristic approximate to that of an incandescent bulb in a relatively simple circuit.

Further in accordance with various aspects of the present invention, an LED lamp may be provided including the driving circuit as described herein.

In an embodiment, an LED driving circuit includes a dimming control value detection circuit adapted to detect a dimming control value which indicates a ratio of the actual current to be supplied from a current source to the driving circuit during a predetermined time period with respect to a rated current. A control circuit is adapted to regulate the amount of current supplied to one or more LEDs during the predetermined time period to either of the squared dimming control value or the cubed dimming control value times the rated current. The characteristic of light output to the amount of current supplied from the current source during a predetermined time period is therefore made approximate to that of an incandescent bulb.

In another embodiment of the present invention, an LED lamp device is provided for driving an array of one or more LEDs. The device includes a housing, an LED driving circuit, and a base. The LED driving circuit includes a dimming control value detection circuit adapted to detect a dimming control value indicating a ratio of the actual current to be supplied from an input power source to the driving circuit during a predetermined time period with respect to a rated current, and a control circuit adapted to regulate the amount of current supplied to one or more LEDs during the predetermined time period based on the detected dimming control value. The control circuit regulates the amount of current supplied from the LED driving circuit during the predetermined time period equal to either of the dimming control value squared or the dimming control value cubed times the rated current. The base is shaped to approximate the shape of a base for an incandescent bulb, integrally formed with respect to the housing and adapted to be connected between the LED driving circuit and a socket associated with the power source. The characteristic of light output to the amount of current supplied from the power source during a predetermined time period is made approximate to that of an incandescent bulb.

In another embodiment, an LED driving circuit is provided in accordance with the present invention to drive an array of LEDs with a substantially equivalent light output as for an incandescent lamp in response to various external dimming control signals. A rectifier circuit is coupled to an AC power source, and a power factor correction circuit is arranged to provide DC current having a fixed magnitude and is effective to drive the one or more LEDs. A dimming control value detection circuit outputs a dimming control signal having a first period with a first output level associated with a conduction period of the first period, and a second output level associated with a non-conduction period of the first period, with the on-duty of the dimming control signal corresponding substantially to a dimming control value received in association with the power from the power source. A pulse width modulation circuit receives the dimming control signal and outputs a pulse width modulation signal having a second period set sufficiently shorter than the first period and including an on-duty period corresponding to the dimming control value for the second period based on at least the dimming control signal. A logic circuit receives the dimming control signal and the pulse width modulation signal, and generates a logical product of the dimming control signal and the pulse width modulation signal. A switch driving circuit receives the square characteristic output signal and generates switch driving signals based at least in part on said logical product. A switching element turns on and off the current supply from the LED driving circuit in response to switch driving signals from the switch driver circuit.

DETAILED DESCRIPTION OF THE INVENTION

Figure 1:
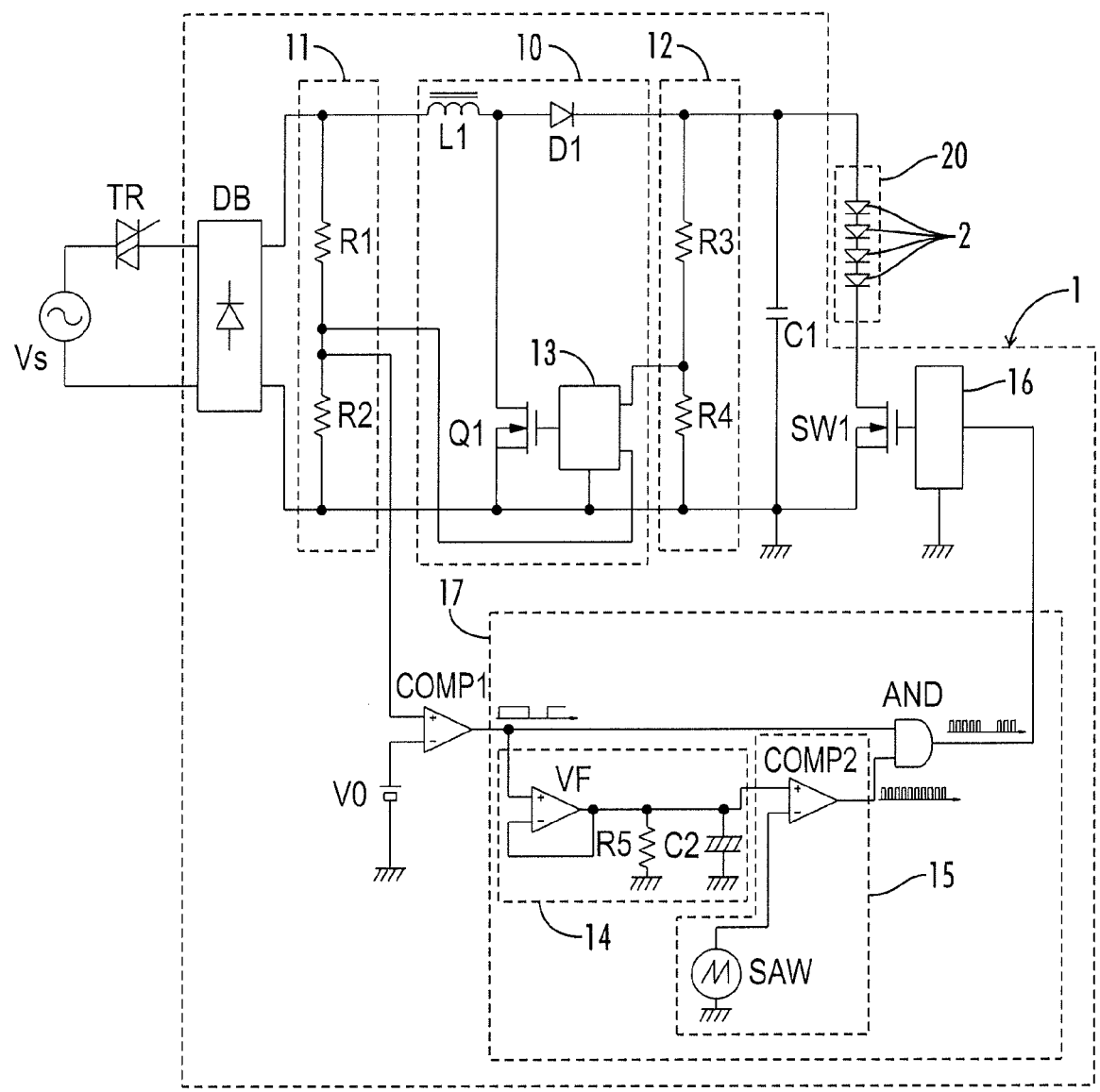
FIG. 1 is a circuit diagram showing an embodiment of a driving circuit of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The terms "connected" and "coupled" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Because an LED driving circuit in accordance with various embodiments of the present invention may be implemented taking into consideration a theory that the light output of an incandescent bulb is proportional to the 8/3 power of current flowing through a filament of the incandescent bulb, the basis of the theory will be first explained here.

Regarding an incandescent bulb, Stefan-Boltzmann law shown in the following Equation 1 is applied:

$$W = \sigma T^4$$

Here, the reference symbol W represents radiant energy, the reference symbol T represents a thermodynamic temperature of a black body, and the reference symbol $\sigma$ represents the Stefan-Boltzmann constant ($\sigma = 5.67 \times 10^{-8}$). Assuming that power P supplied to an incandescent bulb is completely converted into the radiant energy W, the radiant energy W is also expressed by the following Equation 2 using a supplied voltage V and current I:

$$W = P = V \cdot I$$

Filament resistance R is expressed by the following Equation 3 using a constant a, because it is proportional to a temperature T at the time:

$$R = aT = V/I$$

If Equation 1 and Equation 2 are substituted into Equation 3 to remove T, the following Equation 4 and Equation 5 are obtained, respectively (the reference symbol K represents a constant):

$$V = K \cdot I^{5/3}$$

$$P = K \cdot I^{8/3}$$

From this analysis, it may be derived that the light output of an incandescent bulb is substantially proportional to the 8/3 power of current flowing through the bulb filament.

As for the light output vs. current characteristic of an LED, it is known in the art that the current and the light output are approximately proportional to each other.

In the following explanation, as used herein the light output at a rated lighting time and the current at a rated lighting time may refer to the "rated" or "full" light output (L0) and current (I0), respectively. Further as used herein, the radiated light output per unit time (L) and the supplied current per unit time (I) may refer to the "actual" radiated light output and supplied current, respectively, over a predetermined time period which may normally be one-half of an AC power cycle, but is not explicitly limited to such. A "dimming control value (d)" does not generally represent a ratio of actual light output to a rated light output, but instead may generally represent a ratio of the actual current I in an incandescent bulb during a dimming time period of an incandescent bulb with respect to a rated current I0 (namely, d=I/I0, or alternatively stated I=I0×d).

Therefore, an incandescent bulb and an LED that are equal in light output at the rated current I0 may have substantially different light outputs even when they are given equal dimming control values d. That is, because the value of current in the incandescent bulb becomes I=I0×d, the light output of the incandescent bulb becomes a value proportional to the 8/3 power of the current I (namely, $I^{8/3}$) from the theory described above. For the LED, on the other hand, because the current value and the light output are approximately proportional to each other, if current of the 8/3 power times the current I (=I0×d) in the incandescent bulb is applied to the LED, a dimming characteristic equivalent to that of the incandescent bulb can be obtained.

In an embodiment, a driving circuit performs dimming control of an LED by reducing the amount of current in an LED during a predetermined time period (e.g., the "average" current) to a value obtained by multiplying the amount of current at a rated lighting time (or in other words the full current, e.g., the rated current I0 which is caused continuously and with a fixed magnitude) by an integer power proximate the 8/3 power of a dimming control value d ($1 \geq d > 0$). As 2<8/3<3, an appropriate integer proximate "8/3" would be "2" or "3" and therefore the amount of current in the LED during a predetermined time period is controlled to be the dimming control value d, either squared or cubed, times the rated current.

Figure 2:
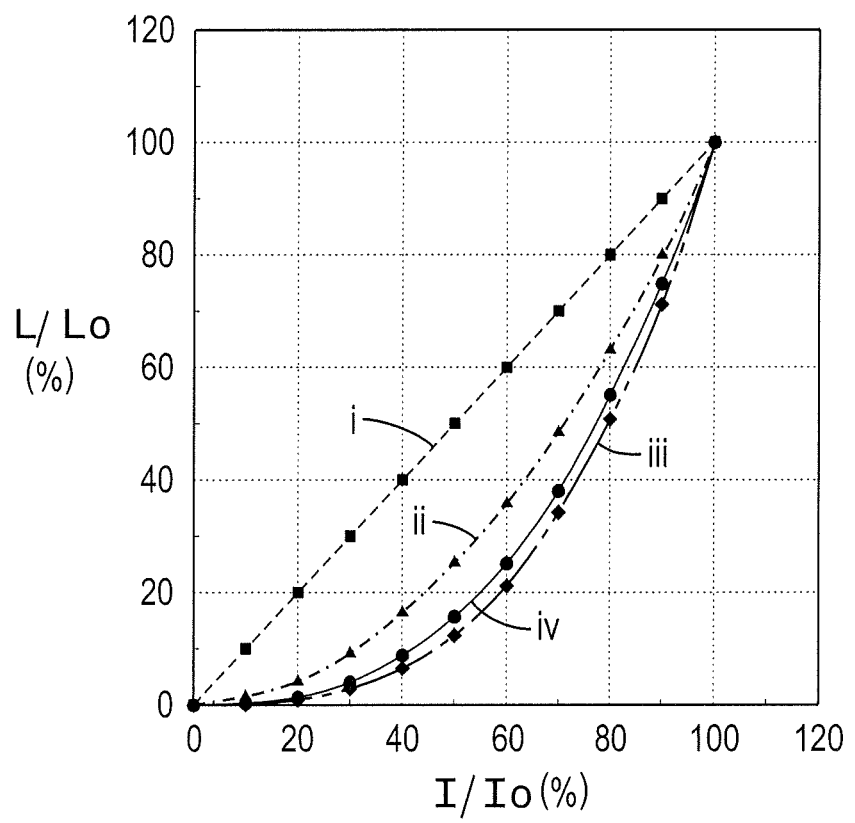
FIG. 2 is a graphical diagram showing various characteristics of light output to current in the driving circuit of FIG. 1.

Referring to FIG. 2, light output vs. current characteristics are shown representing the changes of light output relative to the proportion, the square, the cube, and the 8/3 power of current changing between 0% to 100% of the rated current I0 ("i", "ii", "iii", and "iv" in FIG. 2 represent the proportion, the square, the cube, and the 8/3 power, respectively). Of these characteristics, a characteristic showing the 8/3 power corresponds to the light output vs. current characteristic of an incandescent bulb, while a characteristic showing the proportional characteristic (linearity) corresponds to the light output vs. current characteristic of an LED. In FIG. 2 as shown, the horizontal axis indicates the magnitude of applied current in relation to rated current I0 (i.e., I/I0, expressed as percent), and the vertical axis indicates the magnitude of light output (L) in relation to that the light output at the rated lighting time L0, or in other words in relation to the rated light output L0 (i.e., L/L0, also expressed as percent). The horizontal axis in FIG. 2 may be further understood to correspond to the dimming control value d.

As is also apparent from FIG. 2, the light output vs. current characteristic of the LED obtained by squaring or cubing the current in an LED comes substantially closer to the light output vs. current characteristic of an incandescent bulb (characteristic of the 8/3 power) than that in the proportional characteristic. Hereinafter, the light output vs. current characteristics satisfying respective characteristics of the square, the cube, and the 8/3 power as shown in FIG. 2 may be referred to as "a square characteristic," "a cube characteristic," and "an 8/3 power characteristic," respectively.

Referring now to FIG. 1, an embodiment of a driving circuit 1 being able to realize the square characteristic in accordance with the previous disclosure may now be described. The driving circuit 1 as shown is provided with a full-wave rectifier DB connected to an AC power source VS via a triac TR for phase control. The AC power source VS and the triac TR define a current source which supplies current to the driving circuit 1. The full-wave rectifier DB converts an AC voltage phase-controlled by the triac TR into a DC voltage and outputs the same. The triac TR phase-controls an AC voltage input from the AC power source VS in response to an external control signal applied to a gate. The control signal applied to the triac TR is a signal to provide, determine or otherwise establish the dimming control value d.

A DC-DC converter circuit 10, configured to provide a DC voltage output with a predetermined magnitude, is connected across output of the full-wave rectifier DB. The DC-DC converter circuit 10 includes a step-up chopper circuit (i.e., power factor correction circuit) in which a series circuit of an inductor L1 and a switching element Q1 and a series circuit of a diode D1 and a capacitor C1 are connected in parallel across output of the full-wave rectifier DB. The converter circuit 10 has a control circuit 13 that is ON/OFF-controlling the switching element Q1 in response to detection results associated with both of an input voltage (an output voltage of the full-wave rectifier DB) detected at a first voltage-dividing circuit 11 including a series circuit of resistors R1 and R2 and an output voltage (a voltage across the capacitor C1) detected at a second voltage-dividing circuit 12 including a series circuit of resistors R3 and R4. A series circuit of an LED array 20 including a plurality of LEDs 2 connected in series and a switching element SW1 switching supply current on and off to the LEDs 2 is connected at an output of the converter circuit 10.

A first comparator COMP1 may be arranged to compare the detected voltage from the first voltage-dividing circuit 11 with a predetermined reference voltage V0, and connected at a node between the resistors R1 and R2. The magnitude of the reference voltage V0 may be determined so as to output a dimming control signal having a first (H) level for a conduction period of the triac TR (a period from turning-on of the triac TR to turning-off of the triac TR at a zero crossing point of the AC current) from the comparator COMP1, and further having a second (L) level for the remaining (non-conduction) period. As shown by (a) in FIG. 3, a period T0 (first period) of the dimming control signal may correspond generally to a half period of the AC power source VS, and the dimming control signal is on (i.e., at H level) only for a conduction period T1 of the triac TR. Therefore the on-duty ratio (T1/T0) of the dimming control signal corresponds substantially to the dimming control value d.

A second comparator COMP2 is connected at an output of the comparator COMP1 via a voltage follower circuit with a high input impedance VF using an operational amplifier. A parallel circuit of resistor R5 and capacitor C2 are inserted between an output of the voltage follower circuit VF and the circuit ground, such that the parallel circuit and the voltage follower circuit VF in combination provide a smoothing (or filtering) circuit 14. Thereby, a smoothing signal consisting of a DC voltage obtained by smoothing the dimming control signal (see (a) in FIG. 3) from the comparator COMP1 at the smoothing circuit 14 is input into a non-inverting input terminal of the second comparator COMP2. That is, a DC voltage (smoothing signal) is input to the comparator COMP2 which has a magnitude corresponding to the magnitude of the dimming control value d, or otherwise stated the on-duty of the dimming control signal.

A sawtooth generating circuit SAW which generates a sawtooth wave signal with period T2 is connected to an inverting input terminal of the comparator COMP2. The period (second period) T2 is set sufficiently shorter than the ON period of the dimming control signal (conduction period of the triac) (namely, T2<T1). The comparator COMP2 compares the smoothing signal (the DC voltage corresponding to the dimming control value d) and the sawtooth signal with each other to output a PWM (pulse width modulation) signal including an on-duty (T3/T2) corresponding to the dimming control value d for the period T2. In this manner, the comparator COMP2 and the sawtooth circuit SAW form a PWM circuit 15 which generates the PWM signals. Because the dimming control value d can easily be detected by smoothing the dimming control signal at the above-described smoothing circuit 14, the PWM signal including the on-duty corresponding to the dimming control value d can be produced at the PWM circuit 15 in response to the detected result (i.e., the magnitude of the smoothing signal, corresponding to dimming control value d). In an embodiment so described, the smoothing circuit 14 alone or in combination with the first comparator may therefore be referred to herein as defining a dimming control value detection circuit.

Outputs of both the comparators COMP1 and COMP2 are input to an AND circuit (AND), and the AND circuit is configured to generate and output a logical product of the dimming control signal from the comparator COMP1 and the PWM signal from the comparator COMP2. The output of the AND circuit is provided to a switch driver circuit 16 of the switching element SW1 which turns on and off the current supply to the LEDs 2. The switch driver circuit 16 controls the switching element SW such that the switching element SW1 is on for a period where the output of the AND circuit is high (H level) while the switching element SW1 is off for a period where the output thereof is low (L level) (see FIG. 2).

The AND circuit may be referred to as forming a square characteristic circuit 17 in combination with the smoothing circuit 14 and the PWM circuit 15. The switch driving circuit 16 is controlled by the output signal from the square characteristic circuit 17 (e.g., from the AND circuit in an embodiment as shown in FIG. 1). As a result, current is supplied from the converter circuit 10 to the LED array 20 to drive the LEDs 2 during the period where the driving signal is at the H level, while no current is supplied to the LED array 20 to drive the LEDs 2 during the period where the driving signal is at the L level.

In this manner, in an embodiment of the LED driving circuit 1 as shown in FIG. 1 and described herein, the PWM circuit 15 defines a control circuit adapted to control the amount of current supplied to the LEDs 2 during a predetermined time period by using the output (the dimming control value d) of the smoothing circuit 14 (defining a dimming control value detecting circuit), in combination with the AND circuit, the switch driving circuit 16, and the switching element SW1.

Figure 3:
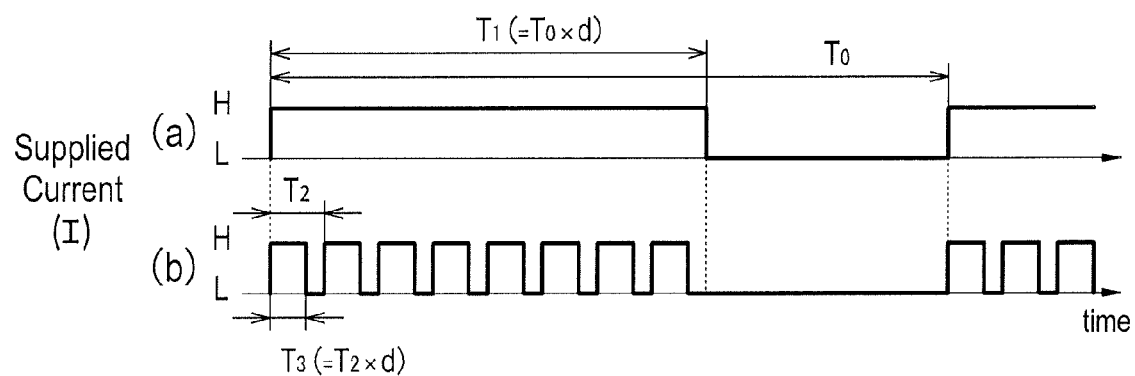
FIG. 3 is a timing chart showing operation of the driving circuit of FIG. 1.

Referring to FIG. 3, operation of the driving circuit 1 thus configured may be further explained, wherein the rated current I0 is a DC current with a fixed magnitude.

Upon receiving the dimming control signal shown by (a) in FIG. 3 and including the period T0 and the dimming control value d as an on-duty, the square characteristic circuit 17 outputs a switch driving signal that is a logical product of the dimming control signal and the PWM signal from the AND circuit, which results in the waveform (b) in FIG. 3. By switching on and off the current to the LEDs 2 via the switch driving signal, the LEDs 2 can be driven by PWM control during a duty-modulated period T2, and with an on-duty corresponding to the dimming control value d, only during the conduction period T1 (=T0×d) of the time period T0 of the phase-controlled AC voltage, and thus the square characteristic described above can be realized.

In other words, although the magnitude of current flowing in the LEDs 2 is always fixed for the period where the driving signal is in H level (a conduction period T1 in each period T0), the amount of current supplied to the LEDs 2 during a predetermined time period (T0) is controlled by controlling the period of current flow in the LEDs 2 via the switch driving signal. Specifically, by calculating the logical product of the dimming control signal including the dimming control value d as the on-duty and the PWM signal including the same dimming control value d as the on-duty, the amount of current supplied to the LEDs 2 per one period T0 of the dimming control signal (namely, a half period of the AC power source VS) is d×d ($d^2$) times the amount obtained in the case in which the rated current I0 with a fixed magnitude is caused continuously.

The LEDs 2 as described above have a light output vs. current characteristic showing that the light output changes in proportion to the amount of current supplied (see "i" in FIG. 2). Therefore, in the case in which the input current from the AC power source VS and phase-controlled to the driving circuit 1 is varied from 0 to 100% of the rated current I0 (namely, in the case in which the dimming control value d is varied in a range from 0 to 1), the light output from the LEDs varies along the curve of the square of the dimming control value d (=$d^2$). In this manner, the characteristic between input current from the AC power source VS phase-controlled to the driving circuit 1 and light output from the LEDs realizes the light output vs. current characteristic indicated by "ii" in FIG. 2, namely, the square characteristic.

Alternatively, where an incandescent bulb is subjected to dimmed lighting based upon the dimming control value d by causing the rated current I0 to continuously flow only for the period where the dimming control signal indicated by "i" in FIG. 3 is H level, the incandescent bulb exhibits the light output vs. current characteristic indicated by "iv" in FIG. 2 (the 8/3 power characteristic). By using a driving circuit 1 such as shown in FIG. 1, the dimming control characteristic approximate to a condition where an incandescent bulb is subjected to dimmed lighting based upon the dimming control value d can further be realized in an LED 2.

To perform dimming control by a PWM control which adjusts an on-time/off-time ratio such that the LEDs 2 are flashed or strobed on/off within a certain period (period T0) as described above, it is important to make the flashing of the LEDs 2 substantially invisible to human eyes. The strobe frequency for the LEDs 2 (1/T0) is set equal to or greater than the critical fusion frequency (a frequency at which, when the strobe frequency is gradually increased, people start seeing the light as if it was continuously lit without sensing a flicker). Because the period T0 corresponds to a half period of the AC power source VS, if the AC power source VS is a commercial power source (50 Hz or 60 Hz) the strobe frequency of the LEDs 2 is 100 Hz or 120 Hz, and therefore the condition that it be equal to or more than the critical fusion frequency is generally satisfied. Incidentally, although the LEDs 2 are strobed or flashed for the period T2 of the PWM signal, the period T2 is sufficiently shorter than the period T0, and thus the condition that the frequency be equal to or greater than the critical fusion frequency is also satisfied.

Figure 4:
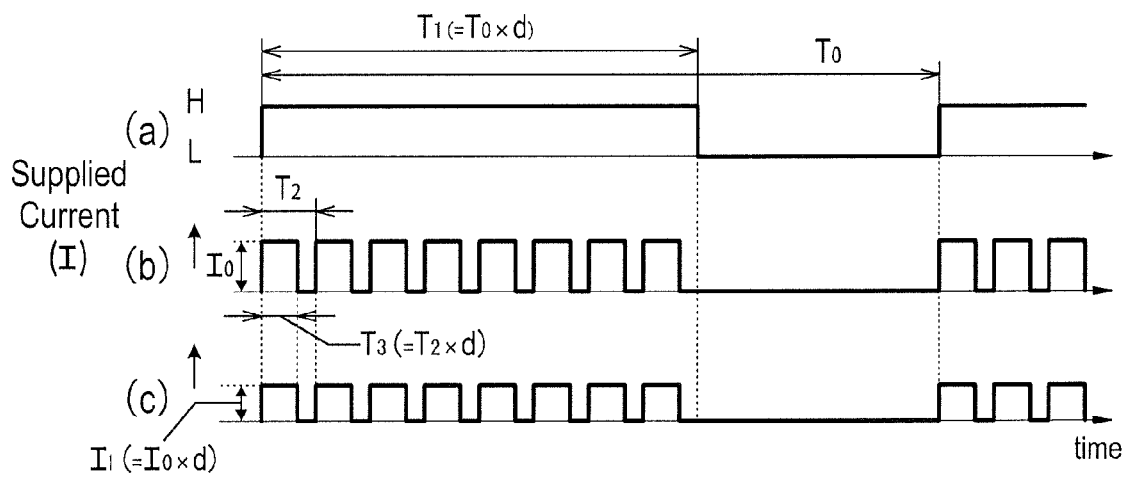
FIG. 4 is a timing chart showing operation of another embodiment of the driving circuit of the present invention.

Referring now to FIG. 4, a control operation for realizing the cube characteristic may be described. Incidentally, (a) in FIG. 4 shows the same dimming control signal, including the period T0 and the dimming control value d as the on-duty, as (a) in FIG. 3 described above.

As described above, the current in the LEDs 2 can realize such a square characteristic (namely, $d^2$ times the rated current I0) as shown in FIG. 4(b) upon receiving the dimming control signal shown in FIG. 4(a) via the square characteristic circuit 17. From the state shown in FIG. 4(b), the magnitude of a current I1 in the LEDs 2 may be further controlled to the dimming control value d times the rated current I0(I1=I0×d), as shown in FIG. 4(c).

In other words, in addition to making the current flow in the LEDs 2 $d^2$ times the rated current I0 with respect to a time axis direction, the magnitude of the current is further made d times the amount of the rated current. Thereby, the amount of current supplied to the LEDs 2 per one period T0 of the dimming control signal becomes d×d×d (=$d^3$) times the amount obtained in the case in which a fixed magnitude of the rated current I0 is caused continuously, so that the cube characteristic can be realized. Incidentally, because the dimming control value d can be detected by the smoothing circuit 14, limiting the amount of the current by using the detection result (dimming control value d) may be realized with a relatively simple structure.

As explained above, by adopting the square characteristic or the cube characteristic, a dimming control characteristic approximate to that of an incandescent bulb may be realized in the LEDs 2 using a driving circuit 1 with a relatively simple structure. Such a driving circuit 1 may inexpensively be provided, as compared with for example the case of reproducing the actual light output vs. current characteristic of an incandescent bulb (the 8/3 power characteristic).

That is, if it is intended to reproduce the actual light output vs. current characteristic of an incandescent bulb, it is required to provide a program or otherwise execute a converting formula for preliminarily calculating the current in the LEDs 2 from the known relationship between the light output vs. current characteristic of an incandescent bulb and the light output vs. current characteristic of an LED 2, such that the driving circuit 1 determines a current in the LEDs 2 according to the program. Therefore, the configuration of the driving circuit 1 to light the LEDs 2 becomes complex, resulting in the driving circuit 1 being significantly increased in cost. On the other hand, because the square or cube characteristics developing a dimming characteristic approximate to the dimming characteristic of the incandescent bulb can be realized by the driving circuit 1 of the present disclosure, having a relatively simple structure and without requiring a complex calculation as carried out by a program or the like, cost reduction with regards to the driving circuit 1 becomes possible.

The specific configuration of the driving circuit 1 described above and as shown in FIG. 1 is, however, merely an example. The dimming control value d may for example be detected by other methods beside the smoothing circuit 14 as described above. The driving circuit 1 may also have a configuration in which the magnitude of current in the LEDs 2 itself is directly controlled to be made $d^2$ times or $d^3$ times the rated current I0, instead of using PWM control.

Further, as a method for realizing the square characteristic or the cube characteristic, a method for programming data of a current in the LEDs 2 relative to the dimming control value d or a method for determining the current by an arithmetic circuit using an operational amplifier may be provided within the scope of the present disclosure. Even in such a case, by adopting the square characteristic or the cube characteristic approximate to the light output vs. current characteristic of an incandescent bulb, there is the advantage that current in the LEDs 2 can be determined by a relatively simple calculation as compared with the conventional example of reproducing the actual light output vs. current characteristic of an incandescent bulb.

In addition, based upon the theory that the light output of an incandescent bulb is proportional to the 8/3 power of the current flowing in a filament of the incandescent bulb, the driving circuit 1 in embodiments as described above performs a control such that the characteristic between the light output and the input current of the LEDs 2 has the square characteristic or the cube characteristic. Even where the light output vs. current characteristic of an incandescent bulb deviates from the 8/3 power characteristic, using the driving circuit 1 of the present disclosure may have the effect of making the (proportional) light output vs. current characteristic of the LED 2 itself closer to that of an incandescent bulb by a relatively simple configuration as compared with the case where the driving circuit 1 is not used.

While the principle of performing ON/OFF control of current flowing to an LED and PWM dimming control of the LED simultaneously via a burst wave signal has been previously known to those of skill in the art, and such a burst wave signal may provide a similar waveform to that of the LED driving signal of the present disclosure (as for example in FIG. 3(b)), various embodiments of a driving circuit and method of approximating the dimming control characteristic of an LED to the dimming control characteristic of an incandescent bulb, and thus the technical idea that the square characteristic is realized such as described herein, does not exist.

In various embodiments, a driving circuit 1 of the present invention may be configured such that color temperature changes according to dimming control. A characteristic of an ordinary incandescent bulb is that color temperature lowers in accordance with increased dimming control (namely, with decreased dimming control value d). On the other hand, many LEDs 2 that are used for illumination radiate white light as a synthetic combination of monochromatic light (blue light) from blue LED chips and light (generally, yellow light) obtained by converting the wavelength of the monochromatic light through a phosphor. The only way to perform dimming control on the LEDs 2 of this kind is to decrease light output from the LED chip, where the color temperature of the synthetic light (white light) changes only slightly in response to the decreased light output, and thus people cannot feel such a color temperature change as with an incandescent bulb.

Therefore, to change the color temperature according to lighting control, in an embodiment of the present invention a neutral white LED which is relatively high in color temperature and a blue-color LED (or an equivalent) which is relatively lower in color temperature than the neutral white LED are employed as LEDs 2. Further, the driving circuit 1 has a configuration in which currents in the respective LEDs 2 can be separately controlled, and in a dimming control state which is close to rated lighting, the currents are controlled such that the neutral white LED has a higher light output ratio than the blue-color LED. On the other hand, with increased dimming control (i.e., decreased dimming control value d), the light output ratio of the blue-color LED is increased and the overall light output (light output of the neutral white LED and the blue-color LED combined) is changed to have the characteristic of the square (or of the cube) to the dimming control value d thereto.

Figure 5:
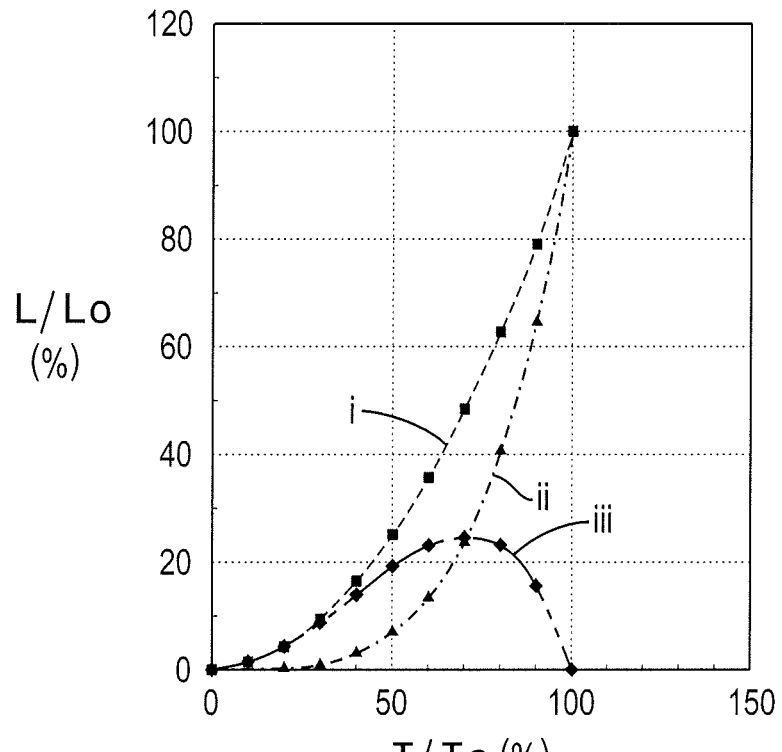
FIG. 5 is a graphical diagram showing characteristics of light output to current in another embodiment of a driving circuit of the present invention.

In FIG. 5, respective light-output characteristics of the neutral white LED and the blue-color LED demonstrate a control operation such that the characteristic between the combined light output and the input current to the driving circuit 1 has the square characteristic ("i", "ii", and "iii" in FIG. 5 indicate the combined characteristics of the two LEDs as a whole, the characteristic of the neutral white LED, and the characteristic of the blue-color LED, respectively). That is, when the input current I of the driving circuit 1 is the rated current I0 (namely, at a time of the dimming control value d=1), only the neutral white LED radiates 100% light output, and the blue-color LED radiates 0% light output. On the other hand, in accordance with a change in the dimming control value d, the neutral white LED changes its light output along a $d^4$ characteristic path ("ii" as shown in FIG. 5), and the blue-color LED changes its light output along a $d^2$-$d^4$ characteristic path ("iii" as shown in FIG. 5). Thereby, the whole light output of combined synthetic light from the neutral white LED and light from the blue-color LED changes along a $d^2$ characteristic path (the square characteristic) according to the change of the dimming control value d (path "i" in FIG. 5).

Figure 6:
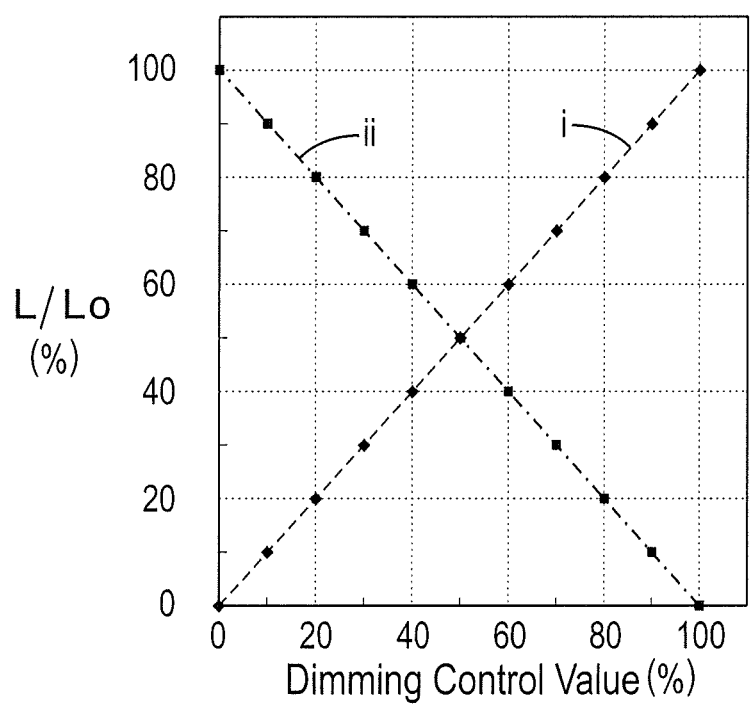
FIG. 6 is a graphical diagram showing characteristics of light output percentage to a dimming control value in the driving circuit of FIG. 5.

In this case, regarding light output percentages of the neutral white LED and the blue-color LED, the percentage of the neutral white LED is proportional to the dimming control value d, while the percentage of the blue-color LED is proportional to (1-d) as shown in FIG. 6 (paths "i" and "ii" in FIG. 6 indicate the characteristics of the neutral white LED and the blue-color LED, respectively). In FIG. 6, the horizontal axis indicates the dimming control value d (expressed in percent figures), but because the input current to the driving circuit 1 is the rated current I0×d, the same result can be obtained even if the horizontal axis indicates the magnitude of the current relative to the rated current I0 expressed in percent figures.

Various configurations and operations previously described with respect to FIGS. 1-4 may apply as well to the embodiments described with respect to FIGS. 5-6, within the scope of the present disclosure as would be understood by one of skill in the art.

Figure 7:
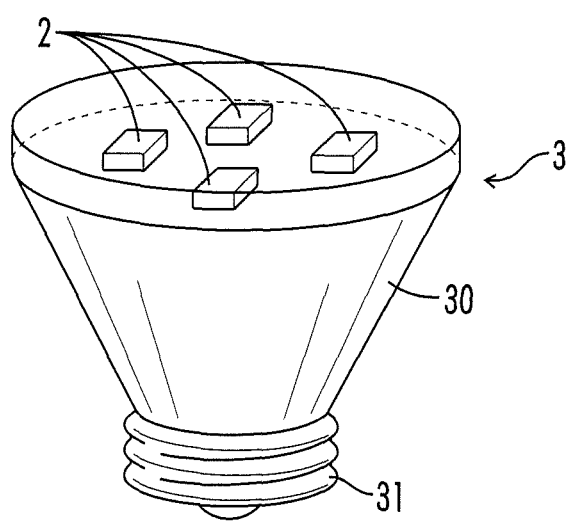
FIG. 7 is a schematic perspective view of an LED lamp with an embodiment of the driving circuit of the present invention.

In various embodiments the driving circuit 1 as disclosed herein may be used, for example, in an LED lamp device 3 in which the LEDs 2 are provided in an incandescent-bulb type housing 30 as shown in FIG. 7. The LED lamp device 3 has a base 31 integrated with the housing 30, and may be used in connection with a socket (not shown) via the base 31 like an ordinary incandescent bulb. The housing 30 also serves as a heat releasing member and may be formed for example in an approximate conical shape with the base 31 at the top, and further may be mounted with a plurality of LEDs 2 on the front surface (upper surface in FIG. 7). The driving circuit 1 of an embodiment as shown may be configured to be contained within the housing 30 and connected with the base 31 at the input end of the full-wave rectifier DB serving as a power-source input end.

By using an LED lamp device 3 thus configured, it becomes possible to use the LEDs 2 as a light source in place of an ordinary incandescent bulb. In addition, because the driving circuit 1 of the LEDs 2 has the function of realizing the square characteristic or the cube characteristic described above, even where the LED lamp device 3 is used in a light fixture for an incandescent bulb which performs dimming control based upon phase control, dimming characteristics approximate to those of an incandescent bulb can be realized. As a result, also in the light fixture with dimming functions based upon phase control, it becomes possible to replace an incandescent bulb with the LED lamp device 3 using the LEDs 2 without invoking a feeling of strangeness of "coldness" during a dimming operation.

Thus, although there have been described particular embodiments of the present invention of a new and useful LED Lamp Driving Circuit with Dimming Capability, it is not intended that such references be construed as limitations upon the scope of this invention except as set forth in the following claims.

What is claimed is:

1. An LED driving circuit arranged to generate and supply an output current effective to drive one or more LEDs, the LED driving circuit comprising:
a dimming control value detection circuit adapted to detect a dimming control value, said dimming control value indicating a ratio of the actual current to be supplied from an input power source to the driving circuit during a predetermined time period with respect to a rated current; and
a control circuit adapted to regulate the amount of current supplied by the driving circuit during the predetermined time period based on the detected dimming control value,
wherein the control circuit regulates the amount of current supplied by the driving circuit during the predetermined time period equal to the rated current times an integer power of the dimming control value, wherein the integer is either of a "2" or a "3" and the rated current is multiplied by either of the dimming control value squared or the dimming control value cubed, respectively.

2. The LED driving circuit of claim 1, further wherein a characteristic of light output to the amount of current supplied from the power source during a predetermined time period is made approximate to that of an incandescent bulb.

3. The LED driving circuit of claim 2, wherein current including the dimming control value as an on-duty is supplied from the power source during an ON period for the predetermined time period as a first period, and the control circuit generates a pulse-width modulation signal including the dimming control value as an on-duty for a second period shorter than the ON period of current supply from the current source, wherein current with a fixed magnitude flows from the LED driving circuit only during one or more periods included in both the ON period of current supply from the current source and an ON period of the pulse-width modulation signal.

4. The LED driving circuit of claim 2, wherein current including the dimming control value as an on-duty is supplied from the power source during an ON period for the predetermined time period as a first period, and the control circuit generates a pulse-width modulation signal including the dimming control value as an on-duty for a second period shorter than the ON period of current supply from the current source, wherein current with a magnitude equal to the dimming control value times the rated current flows in the one or more LEDs only during one or more periods included in both the ON period of current supply from the current source and an ON period of the pulse-width modulation signal.

5. The LED driving circuit of claim 1, wherein the power source comprises a phase-controlled AC power source, and a half cycle of an AC voltage is set as the predetermined time period.

6. The LED driving circuit of claim 5, wherein for each predetermined time period the dimming control value detecting circuit detects a ratio of a period of current supply from the current source to the predetermined time period as the dimming control value.

7. The LED driving circuit of claim 1, further comprising a rectifier circuit arranged to receive AC power from the power source and convert the AC power to DC power, and a DC-DC converter circuit coupled to the rectifier circuit and arranged to convert input DC current to DC current output having a magnitude,
  wherein the control circuit is adapted to regulate the magnitude of the DC current output from the DC-DC converter circuit, and thereby regulate the amount of current supplied to one or more LEDs during the predetermined time period equal to either of the dimming control value squared or the dimming control value cubed times the rated current.

8. The LED driving circuit of claim 1, further comprising
  a rectifier circuit arranged to receive AC power from the power source and convert the AC power to DC power,
  a DC-DC converter circuit coupled to the rectifier circuit and arranged to convert DC current input to DC current output having a magnitude, and
  a first comparator further coupled to the rectifier circuit and arranged to compare a DC voltage from the rectifier circuit with a predetermined reference voltage,
  wherein a magnitude of the reference voltage is determined such that an output of the first comparator is a dimming control signal having a first output level associated with a conduction period and a second output level associated with a non-conduction period, the on-duty of the dimming control signal corresponding substantially to a dimming control value.

9. The LED driving circuit of claim 8, the control circuit further comprising
  a second comparator coupled to the output of the first comparator and arranged to receive the dimming control signal having a first period associated with the predetermined time period and a sawtooth wave signal output from a sawtooth generating circuit, said sawtooth signal having a second period set sufficiently shorter than the first period, the second comparator further arranged to provide a pulse width modulation output signal including an on-duty corresponding to the dimming control value for the second period based on at least the dimming control signal and the sawtooth wave signal.

10. The LED driving circuit of claim 9, the control circuit further comprising:
  a logic circuit arranged to receive the dimming control signal from the first comparator and the pulse width modulation signal from the second comparator, and further adapted to generate and output a logical product of the dimming control signal and the pulse width modulation signal;
  a switch driver circuit arranged to receive said logical product and generate switch driving signals based at least in part on said logical product; and
  a switching element coupled in series with the one or more LEDs and adapted to turn on and off the current supply to the LEDs in response to switch driving signals from the switch driver circuit.

11. An LED lamp device comprising:
  a housing adapted to receive one or more LEDs arranged in series;
  an LED driving circuit further comprising a dimming control value detection circuit adapted to detect a dimming control value, said dimming control value indicating a ratio of the actual current to be supplied from an input power source to the driving circuit during a predetermined time period with respect to a rated current, and a control circuit adapted to regulate the amount of current supplied to one or more LEDs during the predetermined time period based on the detected dimming control value, wherein the control circuit regulates the amount of current supplied from the LED driving circuit during the predetermined time period equal to the rated current times an integer power of the dimming control value, wherein the integer is either of a "2" or a "3" and the rated current is multiplied by either of the dimming control value squared or the dimming control value cubed, respectively;
  a base shaped to approximate the shape of a base for an incandescent bulb, said base integrally formed with respect to the housing and adapted to be connected between the LED driving circuit and a socket associated with the power source.

12. The LED lamp device of claim 11, further wherein the characteristic of light output to the amount of current supplied from the power source during a predetermined time period is made approximate to that of an incandescent bulb.

13. The LED lamp device of claim 12, wherein current including the dimming control value as an on-duty is supplied from the power source during an ON period for the predetermined time period as a first period, and the control circuit generates a pulse-width modulation signal including the dimming control value as an on-duty for a second period shorter than the ON period of current supply from the current source, wherein current with a fixed magnitude flows in the one or more LEDs only during one or more periods included in both the ON period of current supply from the current source and an ON period of the pulse-width modulation signal.

14. The LED lamp device of claim 12, wherein current including the dimming control value as an on-duty is supplied from the power source during an ON period for the predetermined time period as a first period, and the control circuit generates a pulse-width modulation signal including the dimming control value as an on-duty for a second period shorter than the ON period of current supply from the current source, wherein current with a magnitude equal to the dimming control value times the rated current flows in the one or more LEDs only during one or more periods included in both the ON period of current supply from the current source and an ON period of the pulse-width modulation signal.

15. An LED driving circuit comprising:
  a rectifier circuit arranged to receive AC power from an AC power source and output DC power;
  a power factor correction circuit arranged to receive the DC power from the rectifier circuit and to provide DC current having a fixed magnitude effective to drive one or more LEDs;
  a dimming control value detection circuit arranged to receive the DC power from the rectifier circuit and further adapted to output a dimming control signal having a first period with a first output level associated with a conduction period of the first period and a second output level associated with a non-conduction period of the first period, the on-duty of the dimming control signal corresponding substantially to a dimming control value received in association with the power from the power source;
  a pulse width modulation circuit arranged to receive the dimming control signal and further adapted to output a pulse width modulation signal having a second period set sufficiently shorter than the first period and including an on-duty corresponding to the dimming control value for the second period based on at least the dimming control signal;
  a logic circuit arranged to receive the dimming control signal and the pulse width modulation signal, and further adapted to generate and output a logical product of the dimming control signal and the pulse width modulation signal a switch driving circuit arranged to receive the square characteristic output signal and generate switch driving signals based at least in part on said logical product; and a switching element adapted to turn on and off the current supply from the LED driving circuit in response to switch driving signals from the switch driver circuit.

16. The LED driving circuit of claim 15, wherein a characteristic of light output to the amount of current supplied from the power source during a predetermined time period is made approximate to that of an incandescent bulb.

17. The LED driving circuit of claim 15, wherein current including the dimming control value as an on-duty is supplied from the power source during an ON period associated with the first period, and the pulse width modulation signal includes the dimming control value as an on-duty for a second period shorter than the ON period of current supply from the current source, wherein current with a fixed magnitude flows in the one or more LEDs only during one or more periods included in both the ON period of current supply from the current source and an ON period of the pulse-width modulation signal.

18. The LED driving circuit of claim 15, wherein current including the dimming control value as an on-duty is supplied from the power source during an ON period associated with the first period, and the pulse-width modulation signal includes the dimming control value as an on-duty for a second period shorter than the ON period of current supply from the current source, wherein current with a magnitude equal to the dimming control value times the rated current is provided only during one or more periods included in both the ON period of current supply from the current source and an ON period of the pulse-width modulation signal.

19. The LED driving circuit of claim 18, wherein the power factor correction circuit is adapted to regulate the magnitude of the current output during the predetermined time period equal to the dimming control value times the rated current.

20. The LED driving circuit of claim 15, wherein the first period further comprises a half cycle of AC voltage received from the power source, wherein for each first period the dimming control value detecting circuit detects a ratio of a period of current supply from the current source to the predetermined time period as the dimming control value.

* * * * *